United States Patent
Boesl

(10) Patent No.: US 11,529,899 B2
(45) Date of Patent: Dec. 20, 2022

(54) HEADREST SUPPORT

(71) Applicant: GRAMMER AG, Ursensollen (DE)

(72) Inventor: Manuel Boesl, Freudenberg (DE)

(73) Assignee: GRAMMER AG, Ursensollen (DE)

(*) Notice: Subject to any disclaimer, the term of this patent is extended or adjusted under 35 U.S.C. 154(b) by 17 days.

(21) Appl. No.: 16/331,973

(22) PCT Filed: Feb. 7, 2018

(86) PCT No.: PCT/DE2018/000023
§ 371 (c)(1),
(2) Date: Mar. 10, 2019

(87) PCT Pub. No.: WO2018/145685
PCT Pub. Date: Aug. 16, 2018

(65) Prior Publication Data
US 2021/0291712 A1  Sep. 23, 2021

(30) Foreign Application Priority Data

| Feb. 9, 2017 | (DE) | 102017001218.0 |
| Dec. 13, 2017 | (DE) | 102017129830.4 |
| Dec. 13, 2017 | (DE) | 102017129831.2 |
| Dec. 13, 2017 | (DE) | 102017129857.6 |

(51) Int. Cl.
*B60N 2/888* (2018.01)
*B60N 2/75* (2018.01)
*B60N 2/80* (2018.01)

(52) U.S. Cl.
CPC .............. *B60N 2/888* (2018.02); *B60N 2/75* (2018.02); *B60N 2002/899* (2018.02)

(58) Field of Classification Search
CPC ..... B60N 2/888; B60N 2/75; B60N 2002/899
See application file for complete search history.

(56) References Cited

U.S. PATENT DOCUMENTS

| 2,931,427 | A | 4/1960 | Goldstein | |
| 7,100,990 | B2* | 9/2006 | Kimura | B60N 2/36 297/125 |
| 7,740,321 | B2* | 6/2010 | Brill | A47C 23/002 297/452.49 |
| 9,254,764 | B2 | 2/2016 | Line | |
| 9,371,019 | B2 | 6/2016 | Zhao | |
| 9,868,533 | B2 | 1/2018 | Tute | |
| 10,173,567 | B2 | 1/2019 | Madrigal et al. | |

(Continued)

FOREIGN PATENT DOCUMENTS

| CN | 105658115 A | 10/2014 |
| GB | 2315408 A | 2/1998 |

(Continued)

*Primary Examiner* — David R Dunn
*Assistant Examiner* — Tania Abraham
(74) *Attorney, Agent, or Firm* — Andrew Wilford

(57) ABSTRACT

The invention relates to a surface structure (10) for a contact surface or support surface (23) of a vehicle equipment part, in particular for a vehicle head restraint (40) or vehicle armrest, the surface structure (10) being elastically deformable, the surface structure (10) comprising at least one surface body (13, 13*a*, 13*b*), each surface body (13, 13*a*, 13*b*) being connected to at least one other surface body (13, 13*a*, 13*b*) and/or to the vehicle equipment part by means of at least one elastically deformable connecting element (16).

19 Claims, 7 Drawing Sheets

(56) References Cited

U.S. PATENT DOCUMENTS

| | | |
|---|---|---|
| 2011/0133531 A1 | 6/2011 | Yeh |
| 2013/0049420 A1 | 2/2013 | Zhao |
| 2015/0001906 A1* | 1/2015 | Line ................ B60N 2/809 |
| | | 297/403 |
| 2015/0314714 A1 | 11/2015 | Miyata et al. |

FOREIGN PATENT DOCUMENTS

| | | | |
|---|---|---|---|
| JP | 2015-083065 A | 4/2015 | |
| WO | WO-2006006930 A1 * | 1/2006 | ............... B60N 2/70 |

* cited by examiner

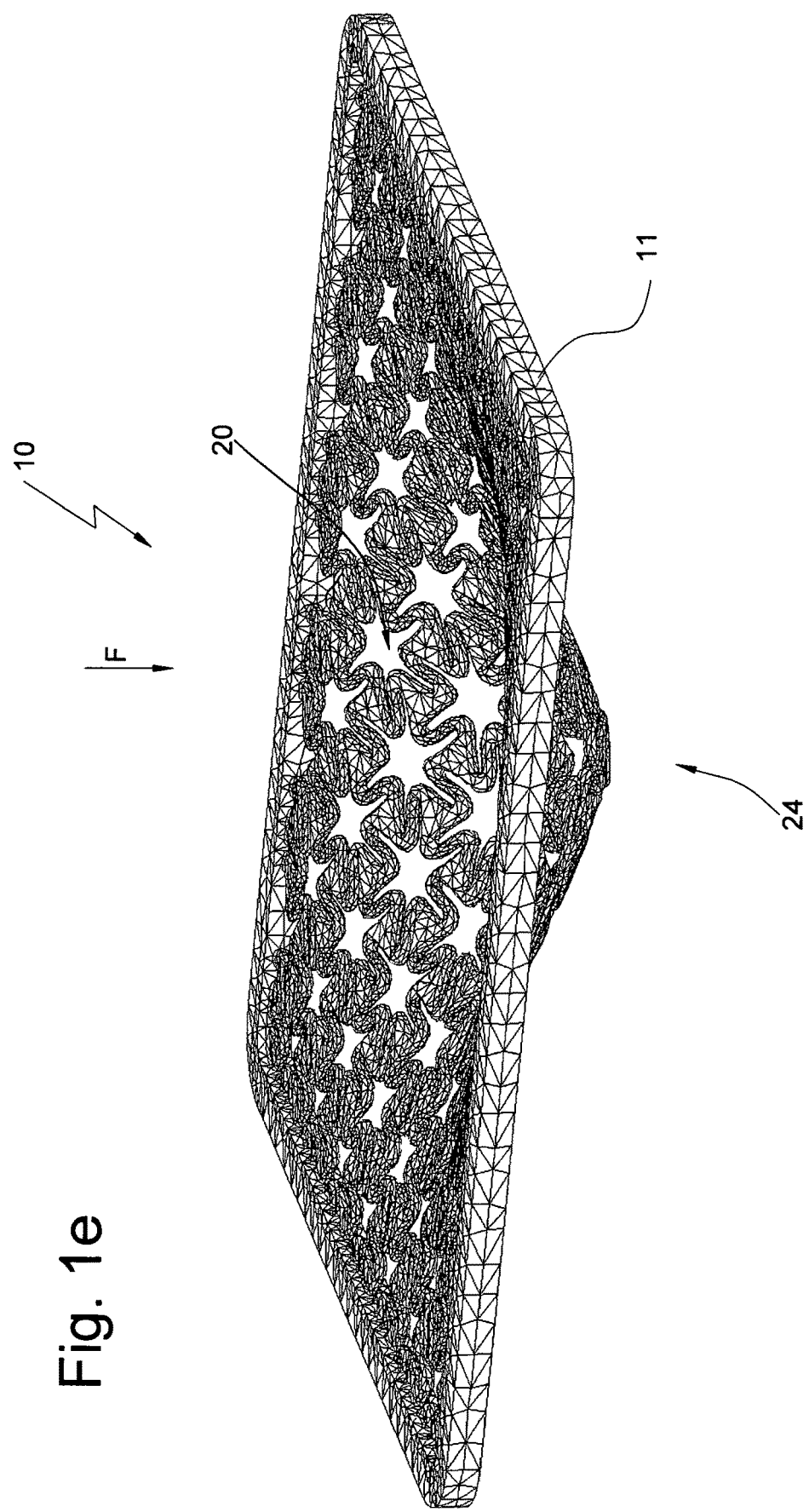

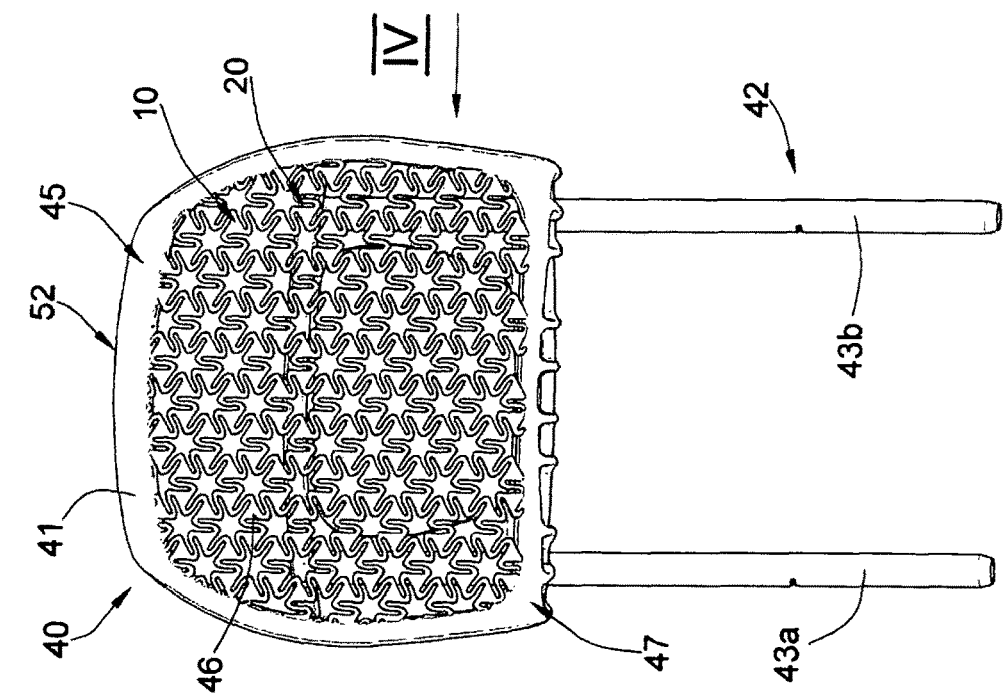
Fig. 3
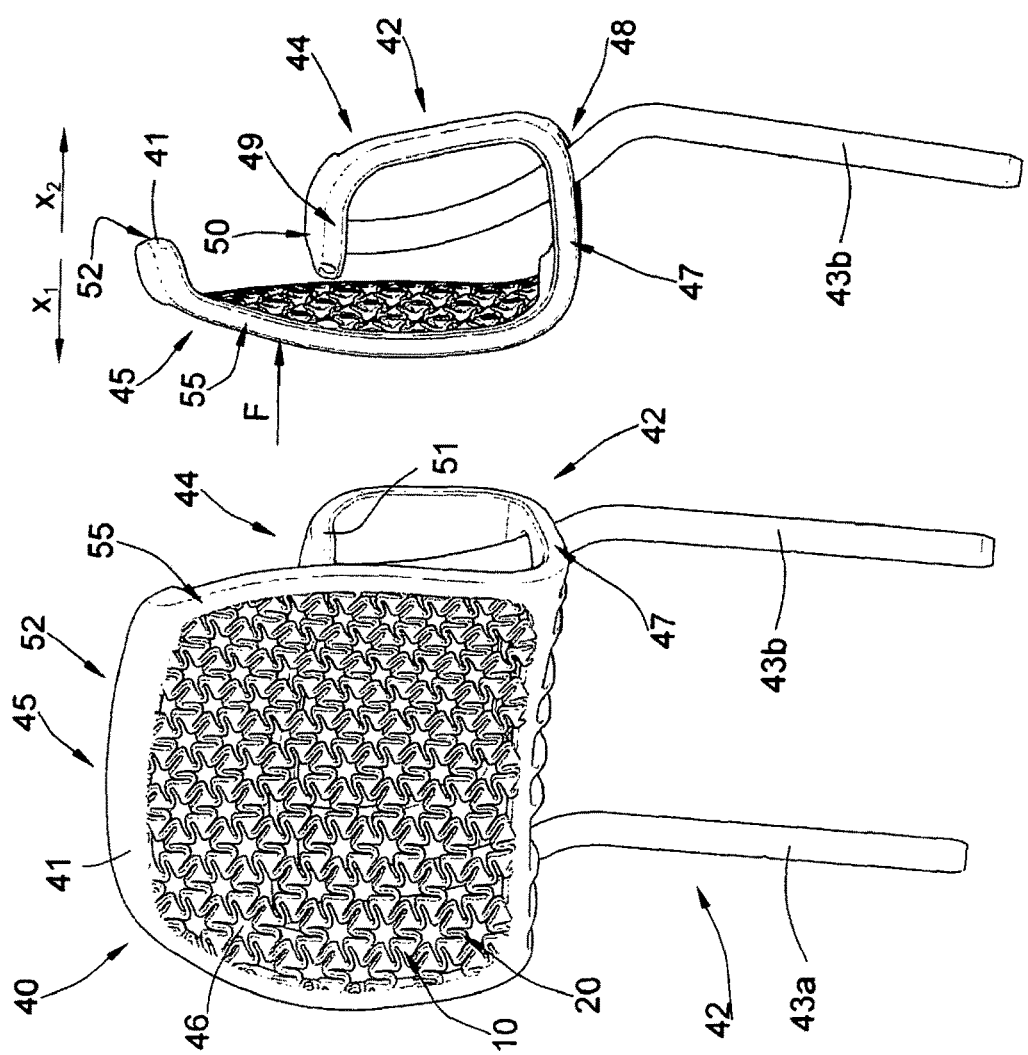
Fig. 4
Fig. 2

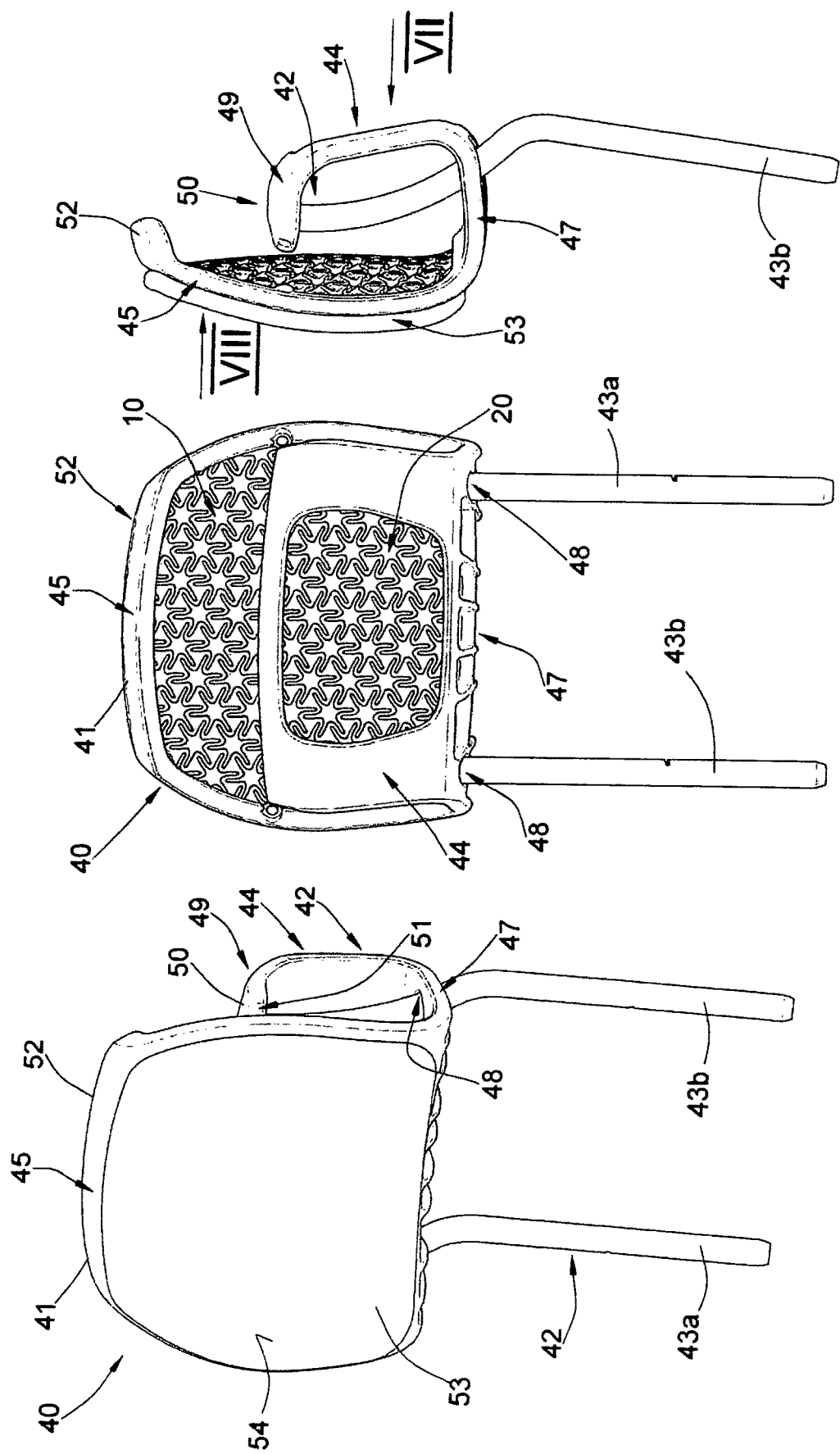

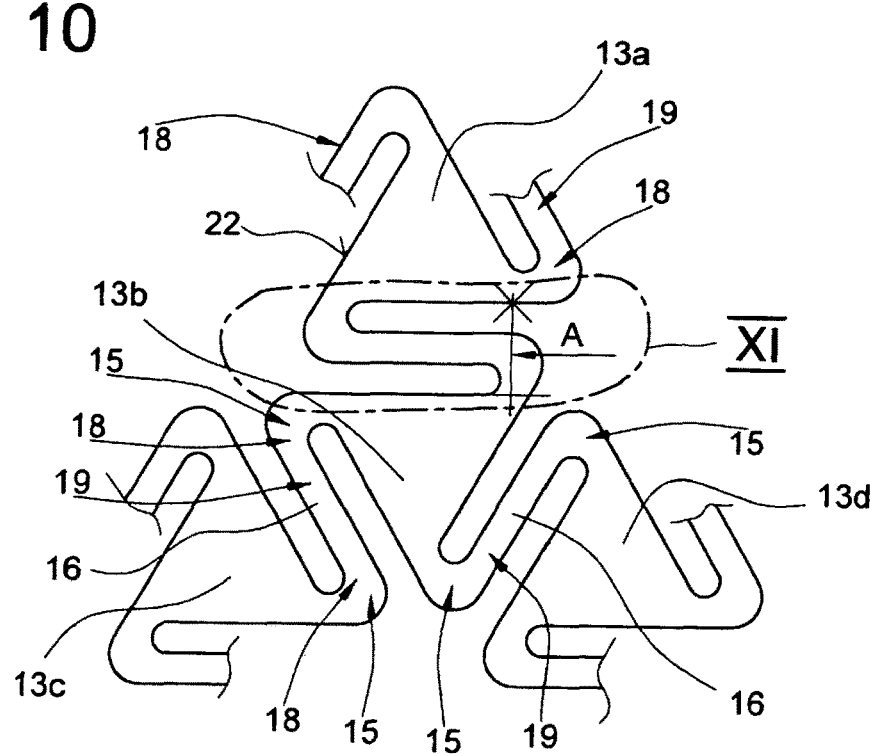
Fig. 10
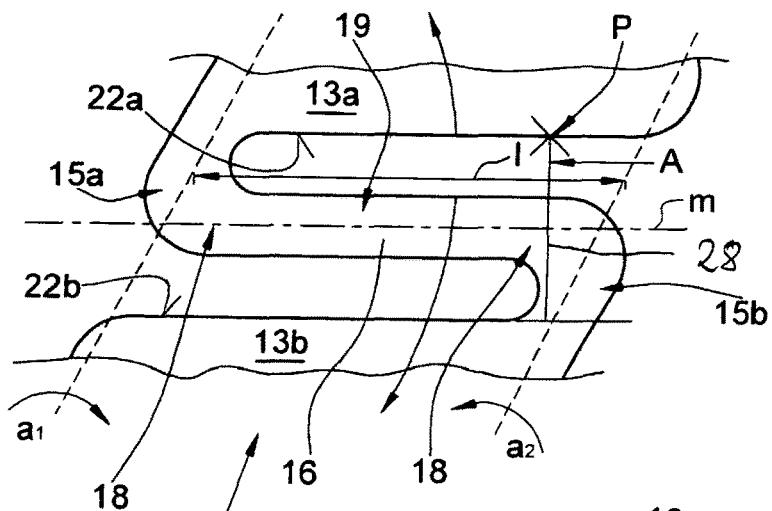
Fig. 11
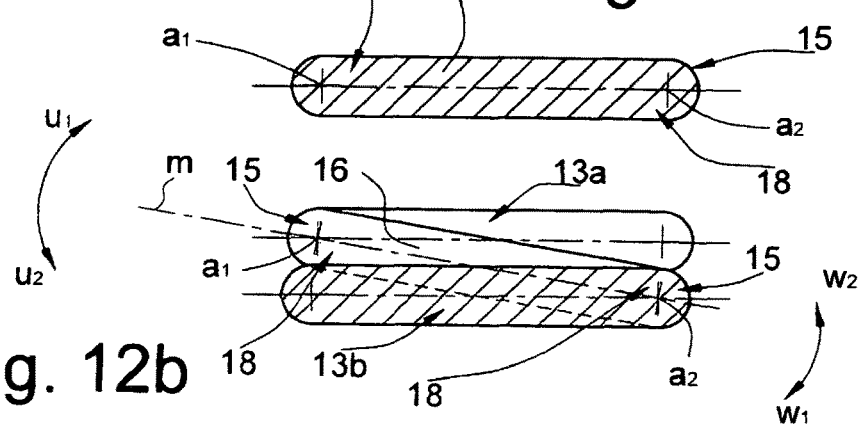
Fig. 12a
Fig. 12b

HEADREST SUPPORT

CROSS REFERENCE TO RELATED APPLICATIONS

This application is the U.S.-national stage of PCT application PCT/DE2018/000023 filed 7 Feb. 2018 and claiming the priority of German patent application 102017001218.0 itself filed 9 Feb. 2017, German patent application 102017129831.2 itself filed 13 Dec. 2017, German patent application 102017129830.4 itself filed 13 Dec. 2017, and German patent application 102017129857.6 itself filed 13 Dec. 2017.

The invention relates to a surface structure, in particular for a vehicle accessory such as a headrest or armrest.

A headrest known from the prior art comprises a headrest part serving as an abutment for the head of the seat occupant. The headrest part is mounted via a support on the vehicle seat, in particular on the backrest of the vehicle seat. The headrest part of the prior art has on a base a plastic brace provided with a foam pad and a cover, for example of textile or leather. Due to the foam cushion and possibly additional soft intermediate layers between the cover and the foam padding, an impact of the head of the seat occupant, for example in an accident, is damped. Even during a mere support contact, the system is comfortable for the occupant because it is soft and compressible.

It is the object of the invention to provide a surface structure that is simple to manufacture and that can be designed flexibly, but that is still relatively large and quite elastic. Furthermore, the surface structure should be easy to clean.

This object is achieved by a surface structure with the features of claim 1.

The surface structure forms a contact face of a vehicle accessory. Contact face means in the sense of the invention that the surface can absorb forces. It can for example also be a support face. For example the surface structure can be used as a surface vehicle head restraint or armrest or a vehicle seat. The surface structure is designed to be elastically deformable, i.e. when engaged by a part of a body the surface structure is elastically deformed. After release, the surface structure automatically returns to the starting position due to the elastic restoring force.

The surface structure comprises at least one surface body that is connected with at least one elastically deformable connecting portion with at least one other surface portion and/or with the vehicle accessory, in particular with a frame of the vehicle accessory. The surface body is for example essentially stiff. The surface body and the connecting portion are for example unitarily made of the same material. According to one embodiment the surface body and the connecting portion are made from different materials. The surface body forms part of the contact face. If more than one surface body is present, the contact face is made up of several surface bodies, in particular formed by all surface bodies.

If the surface structure has several surface bodies, all surface bodies can be designed in the same way. According to an alternative, the surface structure can be of two or more different types of surface bodies. The surface structure can be one or more surface bodies of different type.

A first surface body can deform and move by the elastically deformable connecting portion relative to at least one second surface body or relative to the accessory. When a body part is in contact there is therefore a damped deceleration effect due to the elasticity. In other words, the system does not appear stiff to the user as a rigid surface, but rather soft due to its flexibility. Still it is possible to form the surface structure in one piece with a plastic part, for example headrest part or armrest body.

In this way, even if a stiff material is used for the surface body and/or for the connecting portion, due to the accumulation of elastic deformations of the connecting portions it is possible to achieve a large spring deflection. The rigidity of the surface structure depends for example of the material, of the length and of the number of connecting portions provided in a surface area of the surface structure.

The surface body is for example formed as a sheet. That is, the dimensions of an external surface are small in terms of thickness. The sheet can for example a circle, triangle, square or polygonal.

One embodiment is characterized in that the elastically deformable connecting portion is formed by a web. The web has for example a length that is in large in relation to a diameter of the web. The connecting portion is elastically deformable. I.e. it can for example be bent or twisted from a starting position and then returns to its original shape due to its elastic restoring force.

According to one embodiment, the length of the web is great in relation to its diameter. In this way, considerable relative movement between two surface portions or between a surface portion and the accessory is possible.

The connecting portion is connected for example by a first end to a first surface of a first surface body and by a second end to a second surface of a second surface body or the vehicle accessory. The connecting portion is relaxed in a rest position. In a second, elastically deformed position the connecting portion is elastically deformed. In principle, both the middle part and the ends of the connecting portion deform. In particular, the deformation deforms at least one end of the connecting body, for example by torsion. In this way, the first surface body can move relative to the second surface body so that it is offset from the second surface body in the deformed position.

One embodiment is characterized in that the first outer side edge extends in one direction and the second outer side edge also extends in this direction and confronts the first outer side edge, the second end being offset transversely to this direction at an intersection of one straight line and the second outer side edge, whereby the straight line is the shortest connection between the first outer side edge and of the second outer side edge, the straight line running through the first. On the basis of these features, the connecting portion enables an offset of neighboring surface portions by deformation.

The connecting portion is for example z-shaped and has a central part and two end sections. The deformation of the connecting portion takes place for example at a transition area between the middle part and the end sections.

The surface structure forms for example a module, which can be mounted in a seat of the vehicle accessory. The surface structure is for example attached to a frame. The module can for example be provided with holding and locking means that are brought into engagement with corresponding countermeasures of the accessory.

The surface structure is for example part of a headrest, armrest or vehicle seat. Here, the surface structure can partially or completely form a contact face.

According to a second aspect, the invention relates to a headrest.

Such a headrest is known from prior public use. Reference is made to the prior art mentioned for the first aspect of the invention.

It was the object of the invention to create a headrest with a head contact face that in terms of manufacturing effort and in terms of manufacturing costs is improved. In addition, it was an object of the invention to create a headrest that, in relation to the possibility of cleaning and its property with regard to contamination is advantageous.

The object was achieved by a headrest with the features of claim 1.

The headrest has at least one support rod that attaches it to a vehicle seat. The headrest further comprises a headrest part with a headrest wherein the head contact face at least partially forming a surface structure according to the first aspect of the invention.

According to one embodiment, the headrest part is essentially made from plastic. The headrest part is for example in one piece, in particular as a plastic injection molded part. The headrest part can for example be made in a one-component or two-component injection-molding process. The surface structure is for example integrated into the headrest part, i.e. molded. Alternatively, the surface structure can be attached to the headrest part or for example as a module be formed that is then fastened in a mounting seat of the headrest part.

One embodiment of the invention is characterized in that the headrest part is a plate. The plate is for example shaped so that in a side view (in cross section) it has an I-shape, a G-shape or an O-shape. One area of the plate, in particular one end portion, for example forms the head contact face. One area of the plate, in particular one end portion, for example forms a fastening area for holding the headrest part, for example at least one support rod or support rod bracket.

The head contact part is for example held directly at the support. It has for example at least one mounting seat for an area, for example for an end portion, of at least one support rod or for a portion of a support rod bracket.

The headrest part forms for example an impact surface for the head contact face. I.e. the head contact face of the headrest, for example elastically deform until it contacts the an impact surface. The elastic deformation takes place by deformation of the surface structure and/or through a deformation of the entire head contact portion forming the head contact surface of the headrest. For example the head contact face can be formed as an area of a plate containing the surface structure, the plate and/or the surface structure can deform.

For increasing the comfort, the head contact device, in particular the head contact face, for example can be provided with a soft covering. The soft covering is for example formed by a pillow. The pillow can for example be releasably attached to the headrest part.

Further advantages of the invention can be seen in the embodiments described and shown in the schematic drawing. Therein:

FIGS. 1a to 1d are top views of different embodiments of the surface structure according to a first embodiment of the invention, FIG. 1e is a perspective view of the surface structure according to FIG. 1b when loaded, FIG. 2 is a perspective illustration of a first embodiment of a headrest according to a second variant of the invention, the headrest having a head contact face with a resilient surface structure, FIG. 3 is a front view of the headrest according to FIG. 1, FIG. 4 is a side view according to arrow iv in FIG. 3, FIG. 5 is a perspective illustration like the headrest of FIGS. 2 to 4, but with the head contact face being provided with a cushion, FIG. 6 is a side view of the headrest according to FIG. 5, FIG. 7 is a view according to arrow vii in FIG. 6, FIG. 8 is a front view according to arrow viii in FIG. 6, FIG. 9 is a sectional view according to section line ix-ix in FIG. 8, FIG. 10 shows the detail according to the line x in FIG. 1b;

FIG. 11 shows the detail according to the detail line xi in FIG. 10,

FIG. 12a shows a view according to arrow x11a in FIG. 11, and

Figure 1A:
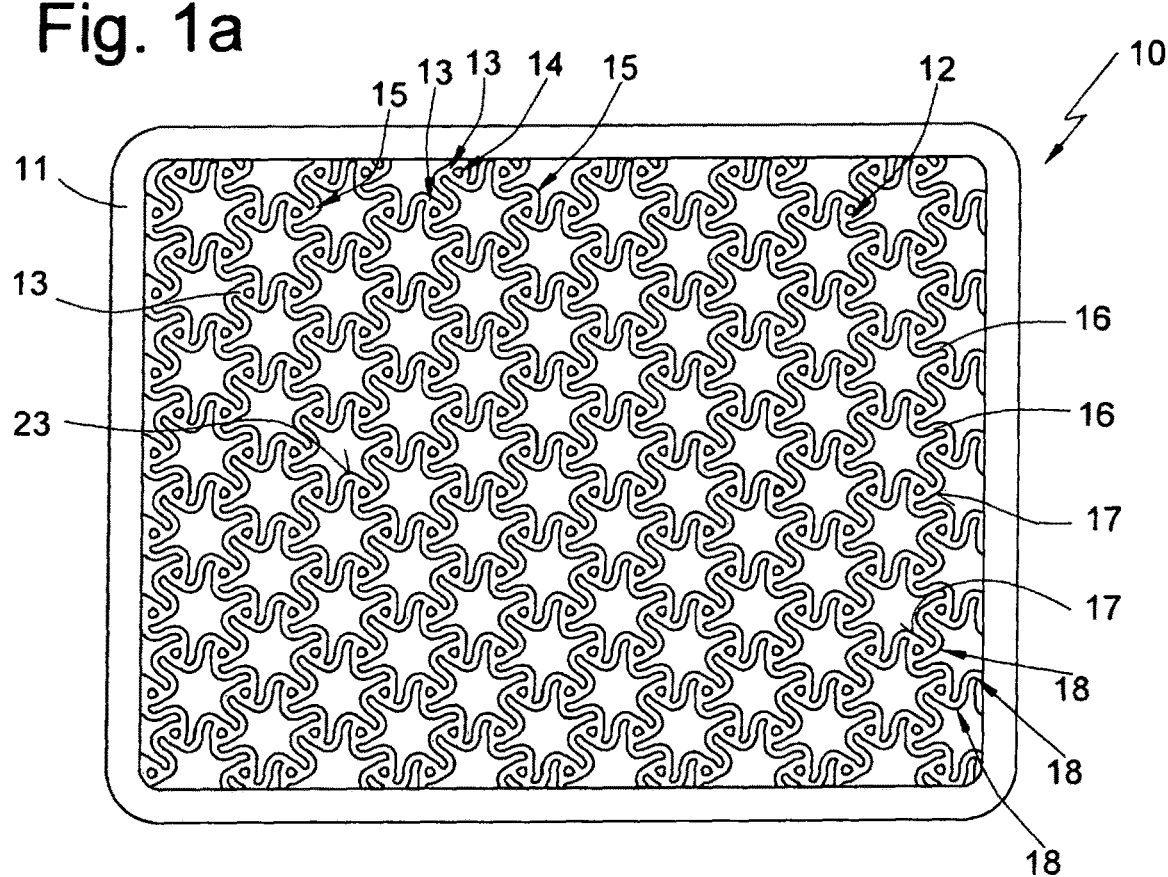

FIG. 12b, like FIG. 12a, shows the detail when the head contact face is loaded.

In the drawing, the surface structure as a whole is indicated at 10. The same references in the different figures refer to corresponding parts, even if lower-case letters are added or omitted.

The surface structure 10 can be designed in different embodiments. As an example, four embodiments are shown in FIGS. 1a to 1d, which are referred to below as arrangements. In FIGS. 1a to 1d, different arrangements 12, 20, 25 and 30 shown. The principle of elastic deformation is the same for all variants. The arrangements 12, 20, 25 and 30 are for example manufactured in one piece.

In FIGS. 1a to 1d, the surface structure 10 is fastened to a frame 11 that is a module in a headrest or other vehicle accessory where a resilient surface structure is desired. In principle, the surface structure 10 can be mounted on a frame 11 or without the use of a frame 11, for example by attaching or molding the arrangement directly to the accessory.

The arrangement 12 shown in FIG. 1a comprises an array of flat triangular surface portions 13 each formed with a perforation 14. Each surface portion 13 has outer side edges 17 as well as three connecting areas 15 each extending from a respective corner of the respective flat triangular surface body 13. At each connecting area 15 a first end 18 of the elastically deformable connecting portions 16 is connected that here has the shape of a web extending between surface bodies 13. Another end 18 of the connecting portion 16 is connected to another one of the surface bodies 13. Between the ends 18 is a central area 19. The connecting portion 16 has a central axis m.

The outer side edges 17 of two adjacent surface bodies 13 are for example roughly parallel to each other. The central axis m runs in the central area 19 for example roughly parallel to the two opposite outer side edges 17.

When loaded with a force f, the surface structure moves into a deformed position with the surface bodies 13 moving relative to one another. FIG. 1e shows the surface structure 10 under the action of a force f. The deformation is based on the principle that the load twists the connecting portions 16 at their ends 18 so that the central portions 19 of the connecting portion 16 can pivot to allow two adjacent surface portions 13 to be offset. The central portion 19 remains essentially undeformed. The principle is explained in more detail below.

Even when using a stiff material for the surface body 13 and for the connecting portion 16 the accumulation of elastic deformations of the connecting portions 16 considerable. The stiffness of the surface structure 10 depends for example on the material, on the length of the connecting portions, in particular the webs, and on the number, contained in a surface area of the surface structure.

In this way, the surface bodies 13 and the connecting portions 16 form a single elastically deformable support face 23.

Figure 1B:
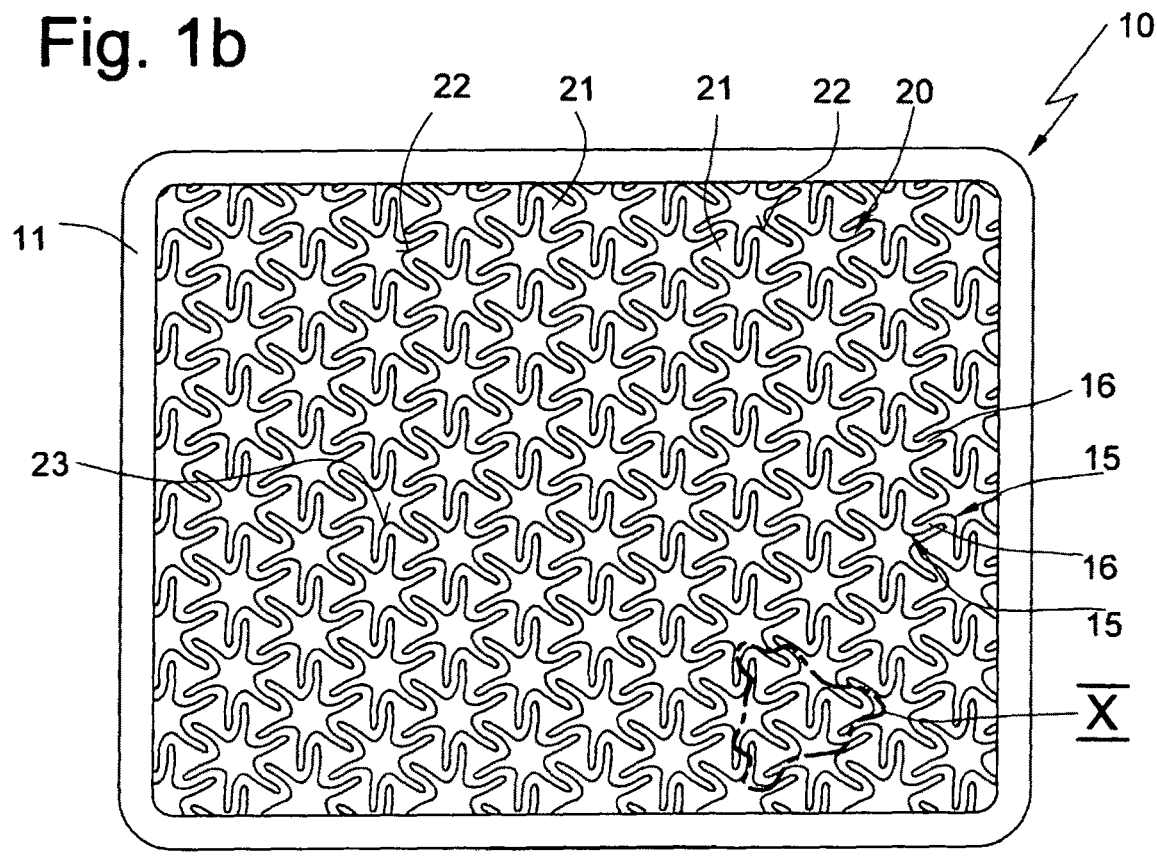

FIG. 1b shows an arrangement 20 that has triangular surface bodies 21. The surface bodies 21 each have three outer side edges 22. Furthermore, each surface body 21 has three connecting areas 15 extending from corners of the respective surface body 21. Each surface body 21 is connected to three connecting portions 16, except for the surface bodies 21 at the outer side edge of the surface structure 10. Each connecting portion 16 has an end 18 connected to one surface body 21 and another end 18 connected with an adjacent surface body 21. In the central portion 19, the central axis m runs approximately parallel to opposite outer side edges 22 of neighboring surface bodies.

Figure 1C:
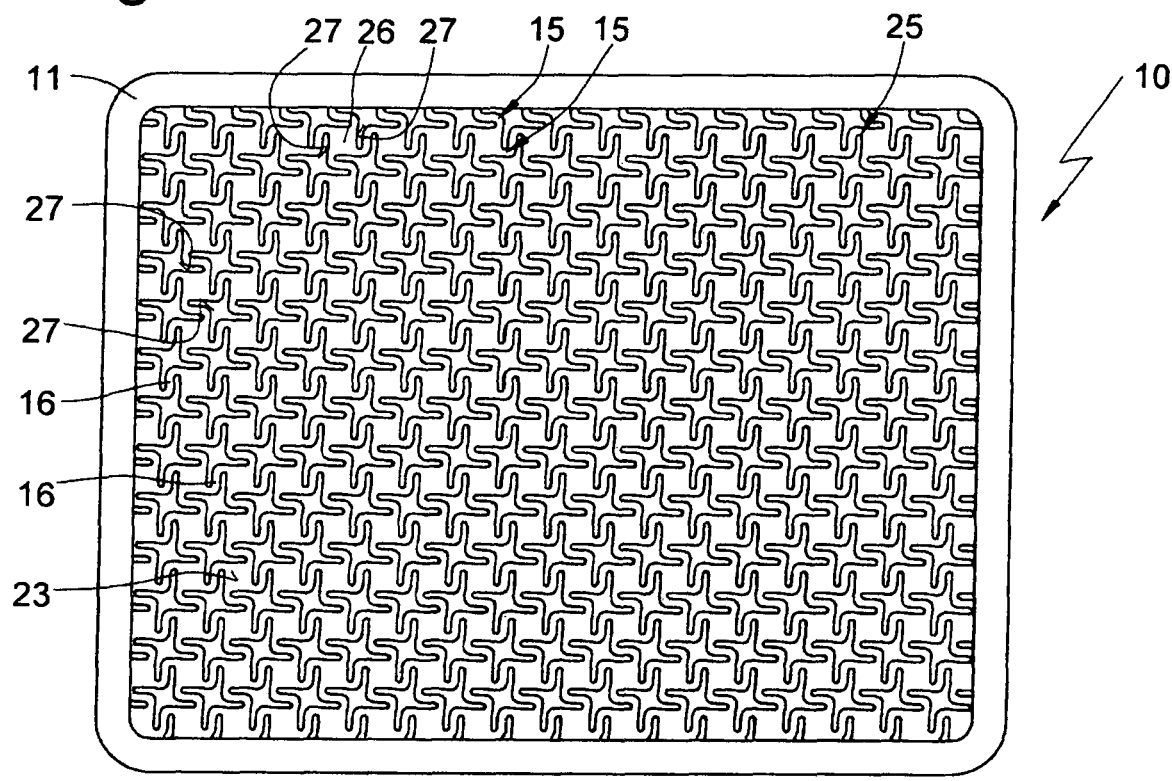

FIG. 1c shows an arrangement 25 with square surface bodies 26, each formed with four outer side edges 27. Each surface body 26 is carried by four connecting portions 16. Each connecting portion 16 is connected to two surface bodies. The connecting areas 15 are portioned at corners portions of the surface body 26.

Figure 1D:
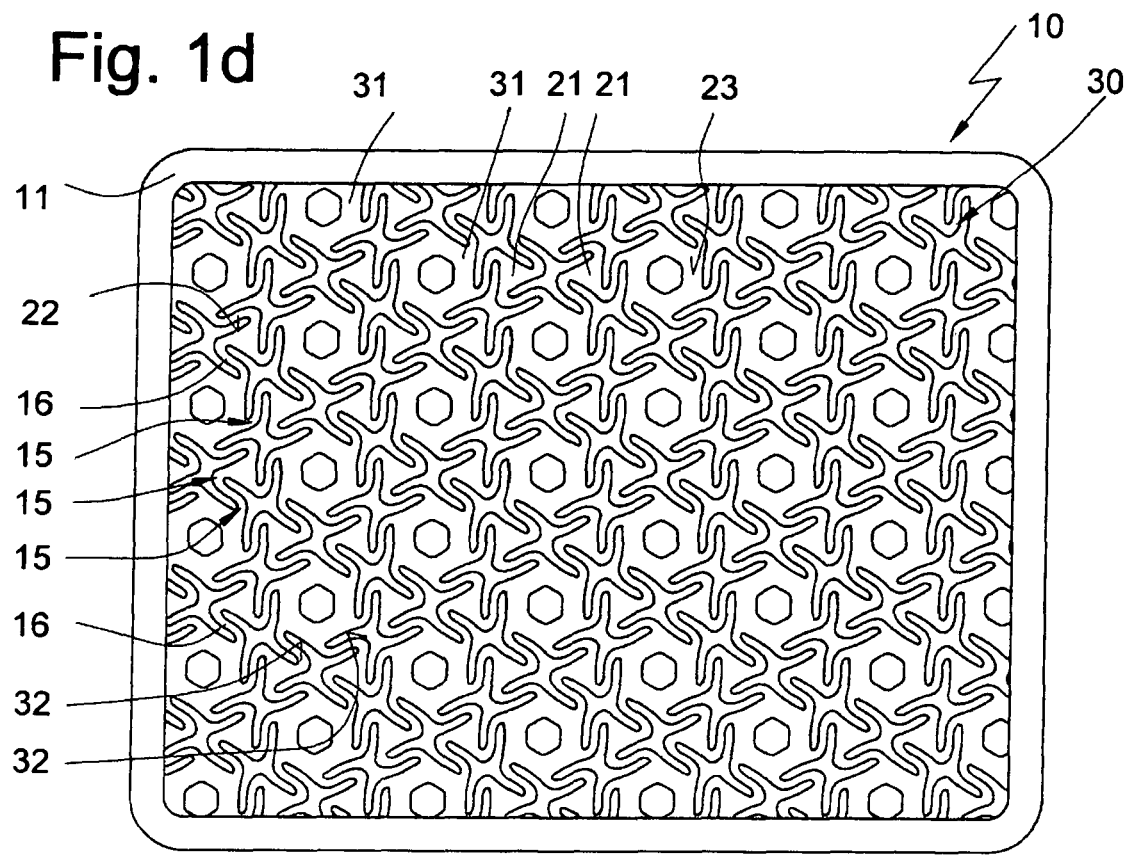
Figure 8:
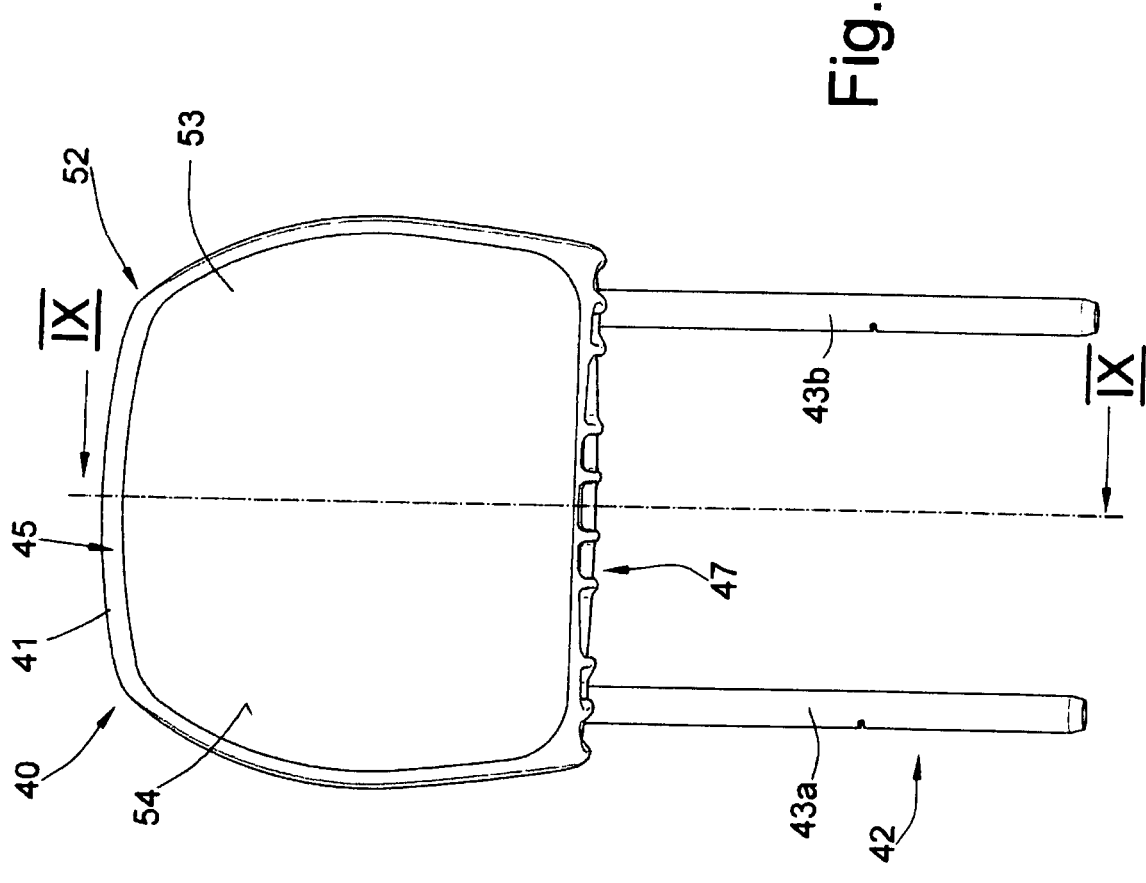
Figure 9:
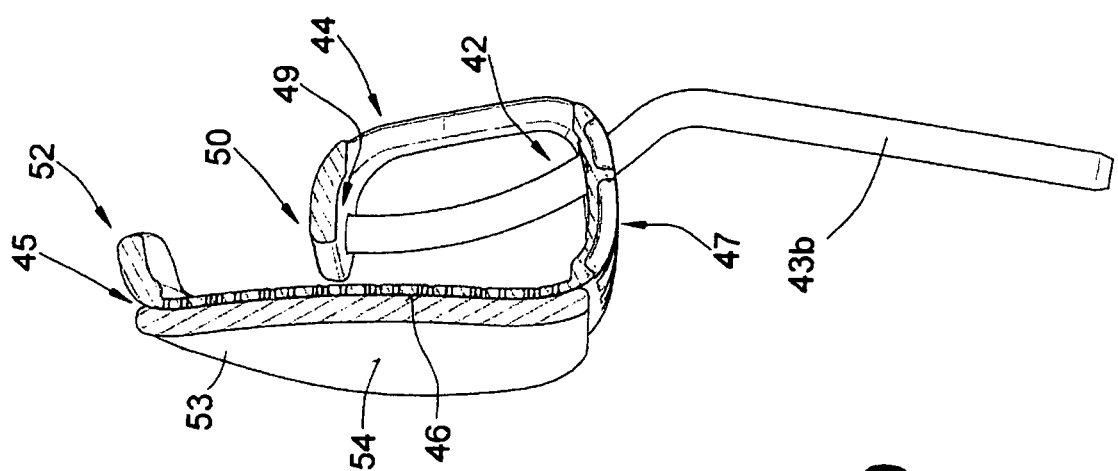

The arrangement 30 according to FIG. 1d has surface bodies 31 and surface bodies 21. The surface bodies 31 are formed by hexagons that are formed with respective perforations 33 and each have six outer side edges 32. Each surface body 31 is connected by six connecting portions 16 to six surface bodies 21.

In FIG. 1e, the arrangement 20 is shown under the action of a force f. A bulge 24 of the contact face can be seen.

The deformation action is illustrated below with reference to FIGS. 10, 11, 12a, and 12b for all surface structures 10, thus also with the arrangements 12, 20, 25 and 30. FIG. 10 shows a section from the arrangement 1b. In FIG. 10 there are four surface bodies 13, designated below with the reference symbols 13a, 13b, 13c and 13d. Each of the surface bodies 13a, 13b, 13c and 13d has three connecting portions 16 connected, creating an elastic connection of the three surface bodies 13a, 13b, and 13c with one another and with further adjacent surface bodies 13. FIG. 10 shows the central portion 19 and the ends 18 of the connecting portions 16.

FIG. 11 is a detail from FIG. 10 showing a region of the surface bodies 13a and 13b and a connecting portion 16 connecting the two surface bodies 13a and 13b.

It is clear that the elastic connecting portion 16 in the form of a web with a first outer side edge 22 of a first surface body 13a forms a first connecting area 15a, and the first outer side edge 22 extends in a direction a while a second outer side edge 22 of a second surface body 13b forms a second connecting area 15b also extending in direction a.

The outer side edges 22 of the adjacent surface bodies 13a and 13b are opposite one another. The second connecting area 15a is laterally offset from an intersection point p in direction a. A straight line 28, which runs through the connecting area 15b and the shortest connection between the outer side edges 22b and 22a of the surface portion 13b and 13a, and the outer side edge 22a cross at the intersection point p. This results in a longitudinal extension of the elastic connecting portion 16, which under load on the structure 10 ensures an offset of the adjacent surface bodies 13a and 13b.

This principle is effective for all surface bodies 13 and the respective connecting portions 16.

FIG. 12a is a view according to the arrow XIIa, with the surface structure relaxed. FIG. 12b shows the detail according to FIG. 12a under load on the surface body 13b with a force f. It can be seen that the connecting portion 16 pivots relative to the surface body 13a about a pivot axis a1 in direction u1 and relative to the surface body 13b is about a pivot axis a2 in the direction w1. A force is exerted by the surface element 13b with a lever arm of length I of the connecting portion 16 on the adjacent surface bodies 13a, 13c and 13d. In addition, the length I of the offset due to the load is effective between the two neighboring surface bodies 13a and 13b. In this embodiment, the length I corresponds approximately tp the length of an outer edge 22 of the surface body 13.

When the load is relieved, the surface structure 10 moves due to the elastic restoring force automatically back to the starting position. I.e. in this embodiment the surface body 13b moves back into its original position relative to surface body 13a according to FIG. 12a, the connecting portion 16 moves relative to the surface body 13a about the pivot axis a1 in the direction u2 and relative to the surface body 13b about pivot axis a2 in the direction w2.

The initial shape of the surface structure 10 does not necessarily have to be flat. It can assume any shape, i.e. the surface structure 10 can for example have a concave or convex shape.

In FIGS. 2 to 4, a headrest is shown. The headrest as a whole is shown in the figures denoted by reference numeral 40.

The headrest 40 comprises a head contact device 41 and a support 42 that is formed by rods 43a and 43b fixed to the head contact device 41. The support rods 43a and 43b each have a lower end fixed in or vertically adjustable on an unillustrated vehicle seat. As an alternative to the support rods 43a and 43b, a support rod bracket could also be used. According to a further alternative, the support 42 could have a part formed in one piece—for example made of plastic injection molding—with the head contact device 41 and fixed on the vehicle seat.

The head contact device 41 comprises a support bracket 44 and a head contact area 45 with a head contact face 46. In the side view according to FIG. 4, the head contact device 41 is roughly of g shape. In a lower portion 47, the headrest part 41 has openings 48 through which the support rods 43a and 43b pass. The openings 48 each have a bearing for mounting the headrest part 41. An upper end of each of the support rods 43a and 43b is connected with a connection 49 with section 50 of the support bracket 44 extending in direction toward the head contact area 45.

A section 50 comprises a baffle surface 51 that has a stop for the head contact area 45 when a force f acts on the head contact face 46 due to deformation of the surface structure 10 and/or due to pivoting of the head contact area 45 in direction x2.

The head contact area 45 merges into the lower area 47 head contact area 45 and has a free end 52. The head contact part 41 is flexible. The head contact area 45 is elastically deformable relative to the bearing area 44 when a force f acts on the head contact face 46.

In addition, the head contact area 45 comprises a frame 55 that surrounds the surface structure 10 to form the arrangement 20. The surface structure 10 is molded in one piece with the head contact device 41. The head contact area 45 can under the action of the force f acting on the head contact face 46, deform from the position one shown in FIG. 4 in the direction x2 and with decreasing force f in the direction x1 back into the original shape. On the one hand, the elastic surface structure 10 can thereby shift relative to the frame 55 and on the other hand the head contact area 45 relative to the deform support bracket 44.

The headrest 10 is for example designed in such a way that the surface structure 10 will be deformed even by a small force, for example by engagement with a head. In this way the shape of the surface structure 10 for example conforms to the head of the seat occupant. The deformation of the head contact area 45 relative to the support bracket 44 takes place for example only with greater forces, as for example during an accident when the head of the seat occupant strikes the head contact area 45 strikes.

The headrest shown in FIGS. 5 to 8 corresponds to the headrest 40 shown in FIGS. 2 to 4 where the head contact face 46 is provided with a cushion 53 forming a contact face 54. By using the cushion 53, an increase in comfort is achieved and the contact force is more evenly distributed over the surface structure 10.

The elastic surface structure 10 can not only be attached to a headrest, but alternatively for example also with other accessories of the vehicle interior, for example with armrests or center consoles used as support or contact faces.

The invention claimed is:

1. A surface structure for a contact or support face of a vehicle accessory, the surface structure being elastically deformable and comprising:
a first surface portion having a first side edge;
a second surface portion having a second side edge that is adjacent, opposite, and spaced from the first side edge; and
an elastically deformable connecting web connected at a first connecting point to the first side edge of the first surface portion and at a second connecting point to the second side edge of the second surface portion, the second connecting point being offset from an intersection of a line extending through the first connecting point and crossing the second side edge, the line defining the closest spacing between the first and second edges.

2. The surface structure according to claim 1, wherein the surface portions are generally planar.

3. The surface structure according to claim 1, wherein the surface structure is formed from plastic, from metal, or from a composite material unitary with the web and surface portions.

4. cThe surface structure according to claim 1, wherein the connecting web has at least one part that is elastically twistable.

5. The surface structure according to claim 1, wherein the surface structure has first fastening means that releasably engages second fastening means of the vehicle accessory.

6. A headrest for a vehicle seat, with a head contact device with a head contact face, mounted by a support on a vehicle seat, and having the surface structure according to claim 1.

7. The headrest according to claim 6, wherein the head contact device is formed by the surface structure and elastically deformable on application of minimum force.

8. The headrest according to claim 6, wherein the head contact device is made in one piece as a plastic injection-molded part.

9. The headrest according to claim 6, wherein the head contact device is mounted directly on the support.

10. The headrest according to claim 6, wherein the head contact device forms an impact surface for the head contact face.

11. The headrest according to claim 6, wherein the head contact device is provided with a soft covering.

12. The headrest according to claim 6, wherein the head contact face is concave or convex in the horizontal direction.

13. The surface structure according to claim 1, wherein the surface portions and web are unitarily formed of one piece from a plastic sheet.

14. A surface structure for a headrest or armrest, the structure comprising:
a frame; and
a sheet having an outer edge secured to the frame and formed inward of the edge by a uniform array of rows of spaced apart polygonal relatively stiff surface portions each having a plurality of straight sides separated at corners with each side of each surface portion spaced from and parallel to a respective side of one of the other surface portions and forming a respective side pair therewith, and
a respective elastically deformable connecting web extending parallel to and spacedly between the sides of each of the side pairs and each having one end attached to one of the respective sides of the respective pair at one of the corners of the respective surface portion and an opposite end attached to the other of the respective sides of the respective pair at an opposite one of the corners of the respective surface portion, whereby a force exerted transverse to a plane of the sheet deforms the sheet by elastically deforming at least some of the webs thereof without substantial deformation of the surface portions.

15. The surface structure according to claim 14, wherein the surface portions are triangular, rectangular, or hexagonal.

16. The surface structure according to claim 14, wherein the webs are unitarily formed with the surface portions.

17. The surface structure according to claim 14, wherein each of the surface portions being formed with a central throughgoing hole.

18. The surface structure according to claim 14, wherein the surface portions and connecting portions define openings of stellate shape.

19. A surface structure for a contact or support face of a vehicle accessory, the surface structure being of an elastically deformable plastic or composite material and comprising:
a first surface portion having a first side edge;
a second surface portion having a second side edge that is adjacent, opposite, and spaced from the first side edge; and
an elastically deformable connecting web connected at a first connecting point to the first side edge of the first surface portion and at a second connecting point to the second side edge of the second surface portion, the second connecting point being offset from an intersection of a line extending through the first connecting point and crossing the second side edge, the line defining the closest spacing between the first and second edges.

* * * * *